UNITED STATES PATENT OFFICE.

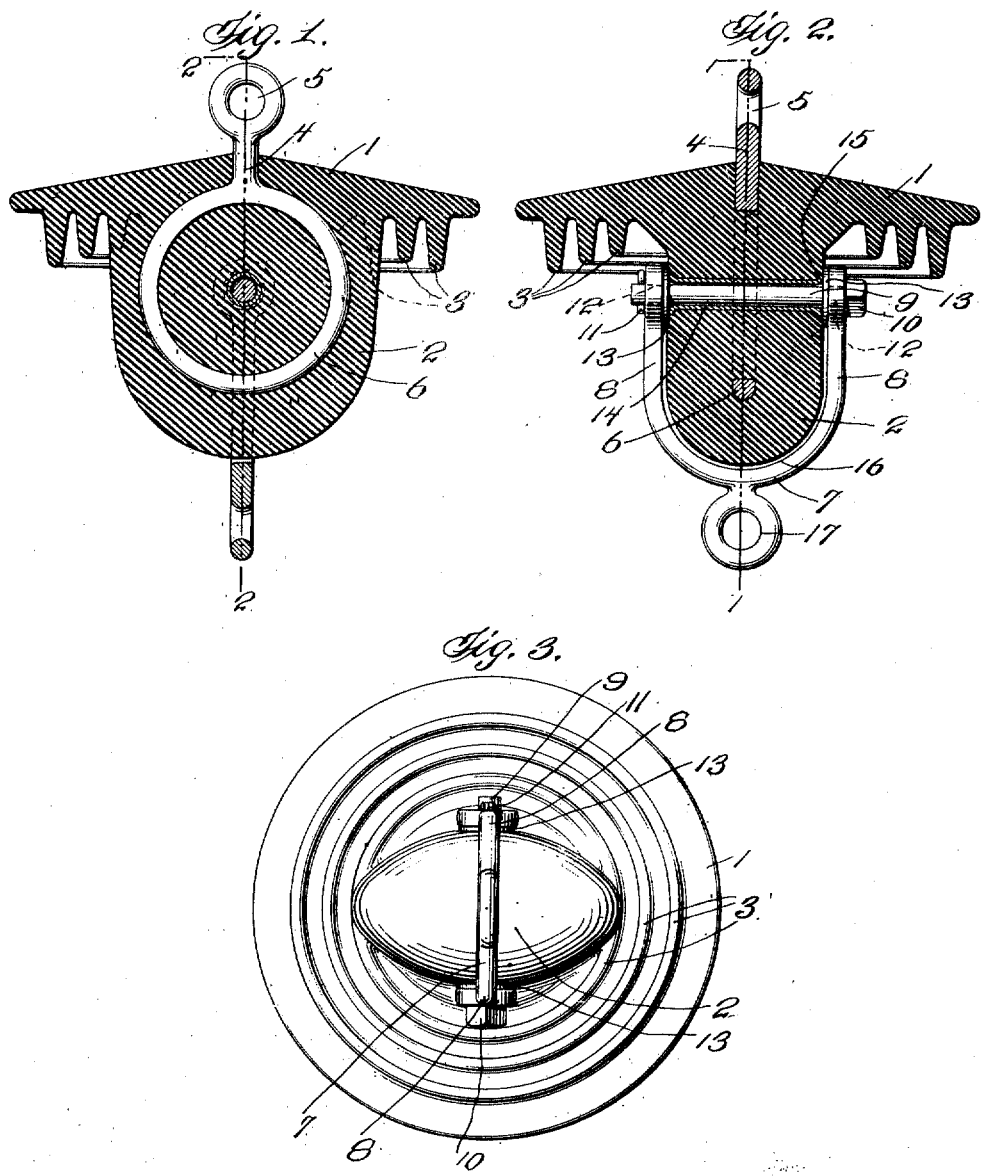

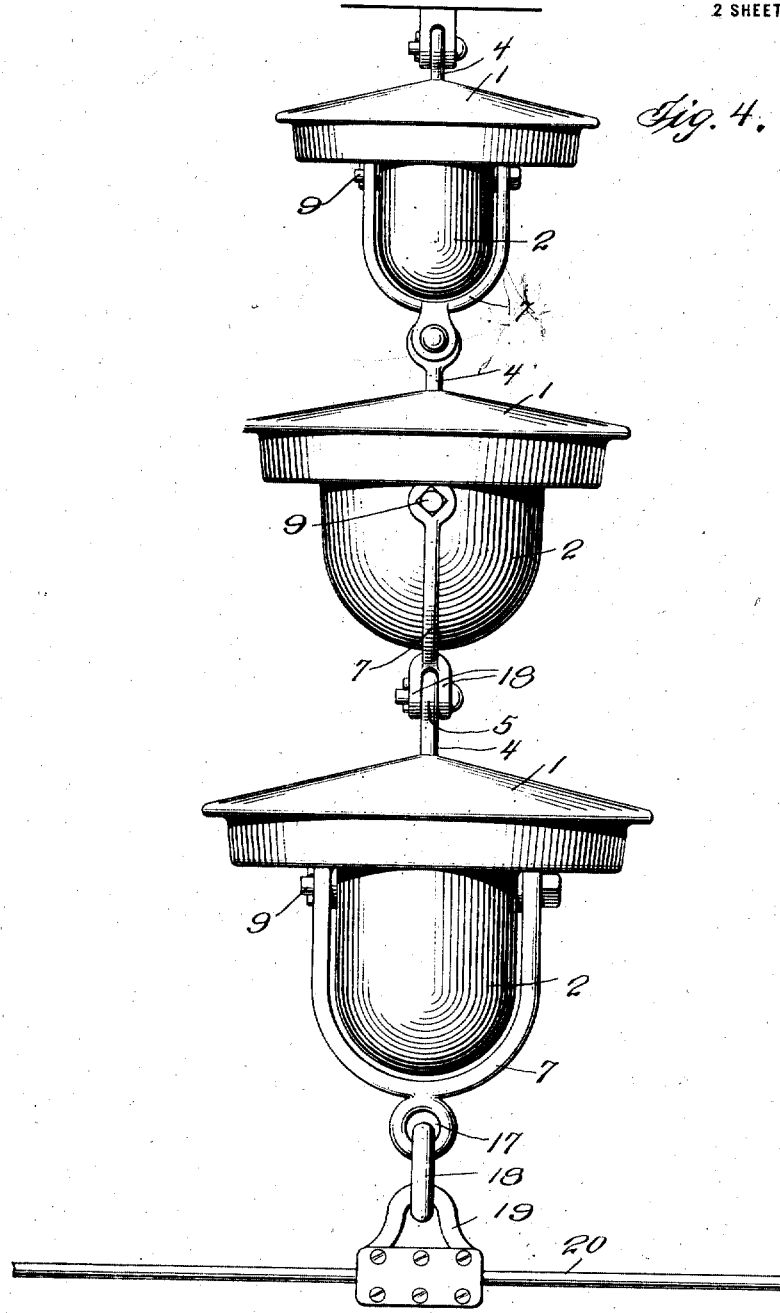

LOUIS STEINBERGER, OF BROOKLYN, NEW YORK.

DISK-TYPE CHAIN INSULATOR.

1,212,703. Specification of Letters Patent. Patented Jan. 16, 1917.

Application filed September 21, 1912. Serial No. 721,693.

*To all whom it may concern:*

Be it known that I, LOUIS STEINBERGER, residing at Brooklyn, in the county of Kings and State of New York, have invented certain new and useful Improvements in Disk-Type Chain Insulators, of which the following is a specification.

This invention relates to disk-type chain insulators adapted for use in connection with high potential electric conductors as employed for various purposes, and the particular object sought to be attained is to provide an improved form of unit, of the disk type, adapted to be arranged in flexible concatenated relation.

A further object is to provide a disk insulator unit having opposed strain members pivotally connected together so that at least one of said strain members will have pivotal movement free of the body of insulating material.

A further object is to arrange the attaching means at the ends of the strain members, for attaching said strain members to supports, so that the unit will be permitted pivotal movement in one plane relatively to the support of one strain member and in another plane relatively to the support of the other strain member, and further to arrange the pivotal connection between the two strain members of the unit so that the plane of movement therebetween is at an angle to the plane of movement between at least one of said strain members and the support of said strain member, this latter feature being designed particularly for permitting a desirable degree of flexibility between all the units of a structure but at the same time serving to prevent excessive or violent swinging thereof, as will be hereinafter particularly pointed out.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown a merely preferred form of embodiment of the invention: Figure 1 is a transverse, vertical, sectional view through an insulator unit constructed in accordance with the principles of this invention, said section being taken substantially on the plane of line 1—1 of Fig. 2, one of the strain members being shown in full line; Fig. 2 is a view similar to Fig. 1 taken at right angles thereto substantially on the plane of line 2—2 of Fig. 1; Fig. 3 is a bottom plan view of the structure shown in Figs. 1 and 2; and Fig. 4 is a side, elevational view of a plurality of units supported in concatenated relation.

In devising the structure hereof I have sought to cheapen and simplify the construction of disk type insulators adapted for use in concatenated relation, though, especially, a single unit may be used by itself when desired. I have provided an insulator unit possessing extremely high insulating qualities, and these qualities are not impaired by any reasonable amount of swinging or swaying of the concatenated units. The units themselves are flexible, each comprising a pivotal part, but the insulating material is so distributed that an ample bulk thereof is at all times maintained between opposing conductors comprised therein regardless of the rotary swinging position of the pivoted parts, and the pivoted portion is so disposed with relation to the disk and protective parts carried thereby as to be practically immune from attack by the elements.

It will be understood that the concatenated structure illustrated comprises units of substantially identical construction. These units, however, are preferably of varying sizes and insulating values, the unit of greatest insulating value being disposed next adjacent the supported conductor so as to encounter the highest voltage therefrom, and subsequent units being of proportionately decreasing values, to correspond to the decreasing voltage. In this manner a maximum efficiency is secured for each of the respective units.

A description of one unit will apply equally to all, and referring to the drawings by numerals for describing a unit in detail, the reference numeral 1 indicates a disk of insulating material, and 2 a lobe shaped portion of insulating material preferably formed integral with the disk and depending substantially centrally from the under surface thereof. One or more annular skirts 3 are formed upon the under surface of the disk and depend for a distance about the lobe 2 so as to more effectually protect the same against direct attacks of the elements, and to prevent a flow of moisture along the under surface of the disk toward the lobe. The upper surface of the disk preferably inclines in all directions downwardly from a central point so as to lead rain water away from the center of the disk.

Extending axially through the disk is a strain member 4 formed with an attaching eye 5 at its upper end, which projects above the upper surface of the disk. The lower portion of the strain member 4 is formed into an enlarged ring shaped portion 6 which is received within the material of the lobe 2 and is entirely enveloped and concealed thereby, the material of the lobe not only covering the outer surface thereof, but also filling the space between its circular walls.

The second strain member as 7, is of substantially U-shape, having spaced legs 8 extending upwardly upon opposite sides of the lobe. A bolt 9 extends transversely through the material of the lobe and engages the upper ends of the legs of the strain member 7, being formed with a head 10 at one end and having a cotter pin, or other fastening means 11, at its opposite end for holding it against accidental detachment from suitable apertures 12 in the upper ends of the legs 8. Washers 13 are interposed between the inner surfaces of the legs 8, and the outer surfaces of the lobe 2 for spacing the legs slightly from the surface of the lobe. A metal lining 14 is fitted within the insulating material of which the lobe is formed, so as to serve as a bearing within which the bolt 9 may freely rotate without any danger of wearing the material of the lobe. This lining is arranged substantially centrally of the ring portion 6 of the strain member 4 and is of such proportionate size as to leave an ample bulk of insulating material intermediate its outer surface and the inner surface of the ring shaped portion 6 of the strain member 4. The opposite ends of the lining 14 are flared into annular portions 15 serving to positively prevent any endwise movement of the lining and consequent abrasion, or wearing of the material of the lobe. The portions 15 also serve to provide a relatively wide bearing surface against which the washers 13 may wear. The bolt 9 and its associated parts comprise a pivotal mounting for the strain member 7, and thus interlinks with the strain member 4 in such manner that tension strain applied to the strain members tends to force the bolt toward the inner surface of the ring 6, which tendency is resisted by the interposed insulating material. The fracture or destruction of this interposed material might allow a physical contact between the two strain members, but would not permit a derangement of the concatenated structure of which the unit forms a part, such as would permit the supported conductor to fall. The bolt 9 and its associated parts, forming the pivot for the strain member 7, is also disposed close up beneath the under surface of the disk so that the disk and the protective parts on the disk will effectually protect said pivotal parts from attacks of the elements.

The strain member 7 is rounded at its lower portion as at 16 and the material of the lobe is so shaped as to practically fill the space between the legs 8, being rounded to fit the portion 16, and this shape is arranged in substantially concentric relation to the pivot 9 so that the material of the lobe practically fills the space within the hollow of the strain member 7 regardless of the rotary position of said strain member, and thus more effectually prevents puncturing through the lobe between the juxtaposed portions of the two strain members.

A suitable attaching eye 17 is formed upon the lower portion of the strain member 7, and this eye, and likewise the eye 5 of the strain member 4, may obviously be of two-part formation as shown at 18 in Fig. 4 if desired.

The structure thus developed, when assembled in concatenated relation provides a satisfactorily, though not too flexible formation. In all units the eyes 5 and 17 are in substantially right angular relation, and in a concatenated structure this feature serves to limit, to a satisfactory degree, the tendency to violent swinging, as from a heavy wind, or otherwise, of the structure, or of the units of the structure, as will be clearly apparent, from an inspection of Fig. 4 of the drawings. In this figure it will be seen that, in swinging to the right or left, the only joints which will be called into play as pivots will be the joints between the first and second unit, and the joint at rod 9 of the second unit. The member 7 of the first unit would remain practically stationary. If the wire 20 is held against longitudinal movement then the only appreciable movement possible would be a lifting movement upon the wire occasioned by rotation of the second insulator unit about its pivotal connection with the member 7 of the first unit, this pivotal movement would swing the rod 9 of the second unit in an arc to the right or left and lift the wire and the third unit bodily upward. The arc of swing of the member 9 would be so small as to result in a considerable lift for a comparatively slight swing, and would consequently effectively resist the swinging of the structure. Supposing the wire 20 to be capable of free longitudinal movement, or to be turned at right angles to the position illustrated at Fig. 4, then the third or bottom unit would swing as a stiff structure to the rod 9 of the second unit.

The rod 9 of the third unit and the pivotal connection between the second and third units would perform no office.

In case the structure should swing upwardly or backwardly, viewing Fig. 4, it is apparent the second unit of the structure would swing as a stiff integral member from the pivot rod 9 of the first unit. The pivotal connection between the first and second unit, and the pivotal connection at 9 of the second unit would perform no office.

The eye 17 of the lowermost insulator unit is engaged by suitable means, as the link 18, for connecting thereto a clamp or other attaching means 19' for directly engaging and supporting the line wire 20.

As many changes could be made in this construction without departing from the scope of the following claims it is intended that all matter contained in the above description or shown in the accompanying drawing shall be interpreted as illustrative only and not in a limiting sense.

Having thus described my invention what I claim as new and desire to secure by Letters Patent, is:

1. In a disk type insulator, the combination comprising a disk of insulating material having an integrally formed lobe pendant therefrom, a strain member extending from the upper side of said disk, a strain member extending from the lower side of said disk, said last mentioned strain member being U-shaped and comprising spaced end portions extending and terminating upon opposite sides of said lobe, and a separately formed straight pivot rod extending through a straight aperture formed through the material of the lobe from one of said spaced end portions to the other, said pivot rod being connected with said spaced end portions to form a pivotal connection between said second strain member and said lobe.

2. In a chain insulator, the combination comprising a plurality of separately formed units, each unit being formed of a body of insulating material and having a pair of strain members pivotally interlinking with each other within the body of insulating material, each strain member having a pivot portion at its outer end, and the pivot portions at the outer ends of the strain members of at least some of said units being disposed in substantially right angular relation to the portions of the strain members constituting the pivots within the respective units, for the purpose described.

In testimony whereof I affix my signature in the presence of two witnesses.

LOUIS STEINBERGER.

Witnesses:
L. GESSFORD HANDY,
NATHALIE THOMPSON.